United States Patent
Toshioka et al.

(10) Patent No.: US 7,845,163 B2
(45) Date of Patent: Dec. 7, 2010

(54) DEVICE FOR PURIFYING EXHAUST GAS OF AN INTERNAL COMBUSTION ENGINE

(75) Inventors: Shunsuke Toshioka, Susono (JP);
Takamitsu Asanuma, Mishima (JP);
Nobumoto Ohashi, Susano (JP);
Yoshihisa Tsukamoto, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 506 days.

(21) Appl. No.: 11/883,936

(22) PCT Filed: Dec. 1, 2006

(86) PCT No.: PCT/JP2006/024505

§ 371 (c)(1),
(2), (4) Date: Aug. 8, 2007

(87) PCT Pub. No.: WO2007/064047

PCT Pub. Date: Jun. 7, 2007

(65) Prior Publication Data

US 2008/0098729 A1    May 1, 2008

(30) Foreign Application Priority Data

Dec. 2, 2005   (JP) .............................. 2005-349805

(51) Int. Cl.
*F01N 3/00*    (2006.01)
(52) U.S. Cl. .............................. 60/286; 60/285; 60/295; 60/299; 60/303
(58) Field of Classification Search .......... 60/284–286, 60/295, 297, 299, 303
See application file for complete search history.

(56) References Cited

U.S. PATENT DOCUMENTS

| 6,170,260 | B1 * | 1/2001 | Ishii et al. ...................... 60/297 |
| 6,742,329 | B2 * | 6/2004 | Miura et al. .................. 60/285 |
| 7,165,392 | B2 * | 1/2007 | Miura .......................... 60/285 |
| 2001/0011455 | A1 * | 8/2001 | Harima et al. ................. 60/288 |
| 2008/0098729 | A1 | 5/2008 | Toshioka et al. |

FOREIGN PATENT DOCUMENTS

| CN | 1375624 A | 10/2002 |
| CN | 1573043 A | 2/2005 |
| CN | 100582454 C | 1/2010 |

(Continued)

OTHER PUBLICATIONS

Oct. 29, 2009 Search Report issued in PCT/JP2006/324505.

*Primary Examiner*—Binh Q Tran
(74) *Attorney, Agent, or Firm*—Oliff & Berridge PLC

(57) ABSTRACT

A device for purifying exhaust gas of an internal combustion engine is provided, equipped with an HC catalyst having the ability to oxidize HC, as well as adsorb HC, and release HC which it has adsorbed, and there exists a specific condition where the amount to release HC becomes greater than the amount to oxidize HC, wherein the device for purifying exhaust gas of an internal combustion engine executes an HC feed control for feeding HC to the HC catalyst. The amount of HC fed to the HC catalyst is decreased by the HC feed control or the HC feed control is discontinued when the specific condition is established during execution of the HC feed control.

8 Claims, 5 Drawing Sheets

FOREIGN PATENT DOCUMENTS

| | | |
|---|---|---|
| EP | 1 223 324 A2 | 7/2002 |
| JP | A 9-4437 | 1/1997 |
| JP | 09152104 A * | 6/1997 |
| JP | A 11-62559 | 3/1999 |
| JP | A 11-81990 | 3/1999 |
| JP | A 11-81991 | 3/1999 |
| JP | A 11-153022 | 6/1999 |
| JP | A 2000-199422 | 7/2000 |
| JP | 2004036543 A * | 2/2004 |
| JP | A 2004-36543 | 2/2004 |
| JP | 2005090434 A * | 4/2005 |

* cited by examiner (A)

(B)

(A)

(B)

DEVICE FOR PURIFYING EXHAUST GAS OF AN INTERNAL COMBUSTION ENGINE

TECHNICAL FIELD

The present invention relates to a device for purifying exhaust gas of an internal combustion engine.

BACKGROUND ART

JP-A-2004-36543 discloses a device for purifying exhaust gas equipped with an oxidizing catalyst and a diesel particulate filter (hereinafter referred to as "DPF") in the downstream of the oxidizing catalyst. In this device for purifying exhaust gas, NO in the exhaust gas is oxidized into $NO_2$ by the oxidizing catalyst and the DPF continuously oxidizes, burns and removes particulates by utilizing $NO_2$ as an oxidizing agent. In this device for purifying exhaust gas, when the amount of particulates deposited on the DPF have exceeded a predetermined amount, HC (hydrocarbons) are fed to the oxidizing catalyst and burned on the oxidizing catalyst to elevate the temperature of the exhaust gas, i.e., to elevate the temperature of the DPF, thereby particulates deposited on the DPF are oxidized, burned and removed.

Concerning the device for purifying exhaust gas disclosed in JP-A-2004-36543, the oxidizing catalyst often adsorbs HC while HC are being fed to the oxidizing catalyst. If HC are adsorbed in large amounts by the oxidizing catalyst, HC may rapidly burn to thermally deteriorate the oxidizing catalyst. Therefore, the device for purifying exhaust gas disclosed in JP-A-2004-36543 has been so designed as to feed HC in decreased amounts to the oxidizing catalyst or to discontinue the feed of HC to the oxidizing catalyst when HC are adsorbed by the oxidizing catalyst in amounts in excess of a predetermined value.

DISCLOSURE OF INVENTION

In case of the device for purifying exhaust gas disclosed in JP-A-2004-36543 as described above, an attempt was made to suppress the oxidizing catalyst from being thermally deteriorated when HC are fed to the oxidizing catalyst in order to elevate the temperature of the DPF. In addition, in the field of devices for purifying exhaust gas of internal combustion engines, when HC are fed to one of the constituent elements of the device for purifying exhaust gas, it also has been desired to suppress the effect of HC not being consumed by the constituent elements of the device for purifying exhaust gas, but simply flowing out therefrom.

Therefore, an object of the present invention is to suppress the effect of HC not being consumed by the HC catalyst, but flowing out in large amounts through the HC catalyst in the device for purifying exhaust gas of an internal combustion engine equipped with the HC catalyst capable of oxidizing HC.

To solve the above problem, the invention in accordance with claim 1 provides a device for purifying exhaust gas of an internal combustion engine equipped with an HC catalyst having an ability to oxidize HC, as well as adsorb HC, and release HC which have been adsorbed, and there exists a specific condition where the amount of HC to be released becomes larger than the amount of HC to be oxidized, the device for purifying exhaust gas of an internal combustion engine executing HC feed control for feeding HC to the HC catalyst, characterized in that the amount of HC fed to the HC catalyst is decreased by the HC feed control or the HC feed control is discontinued when the above specific condition is established during execution of the HC feed control.

The invention in accordance with claim 2 provides the device for purifying exhaust gas according to claim 1, wherein the specific condition mentioned above is the total amount of HC adsorbed by the HC catalyst is larger than a predetermined amount and is at least one of the temperature increase rate of HC catalyst, a rate of increase in the amount of air taken in by the internal combustion engine, a rate of increase in the amount of fuel fed into the combustion chambers of the internal combustion engine or a rate of increase in the amount of depression of accelerator pedal, is larger than a predetermined value.

To solve the above problem, the invention in accordance with claim 3 provides the device for purifying exhaust gas of an internal combustion engine equipped with an HC catalyst having an ability to oxidize HC, and there exists a specific condition where the HC residence time becomes shorter than the time required to oxidize HC, the device for purifying exhaust gas of an internal combustion engine executing a HC feed control for feeding HC to the HC catalyst, characterized in that the amount of HC fed to the HC catalyst is decreased by the HC feed control or the HC feed control is discontinued when the specific condition is established during execution of the HC feed control.

The invention in accordance with claim 4 provides the device for purifying exhaust gas according to claim 1 or 3, wherein the specific condition is that the total amount of HC adsorbed by the HC catalyst is larger than a predetermined amount and that at least one of an amount of exhaust gas passing through the HC catalyst or a rate of increase thereof, an amount of air taken in the combustion chambers of the internal combustion engine or a rate of increase thereof, or an amount of depression of accelerator pedal or a rate of increase thereof, is larger than a predetermined value.

The invention in accordance with claim 5 provides the device for purifying exhaust gas according to any one of claims 1 to 4, equipped with a NOx catalyst in the downstream of the HC catalyst, wherein the NOx catalyst is provided to adsorb NOx when the air-fuel ratio of the exhaust gas that flows in is lean and to reduce NOx that is adsorbed when the air-fuel ratio of the exhaust gas that flows in becomes the stoichiometric air-fuel ratio or a rich air-fuel ratio, and an object of the HC feed control is to let the exhaust gas of the stoichiometric air-fuel ratio or of a rich air-fuel ratio flow into the NOx catalyst.

The invention in accordance with claim 6 provides the device for purifying exhaust gas according to any one of claims 1 to 4, equipped with a NOx catalyst in the downstream of the HC catalyst, wherein the NOx catalyst is provided to adsorb NOx when the air-fuel ratio of the exhaust gas that flows in is lean and to reduce NOx that is adsorbed when the air-fuel ratio of the exhaust gas that flows in becomes the stoichiometric air-fuel ratio or a rich air-fuel ratio, and the object of the HC feed control is to elevate the temperature of the HC catalyst and to let the exhaust gas of the stoichiometric air-fuel ratio or of a rich air-fuel ratio flow into the NOx catalyst, characterized in that the amount of HC fed to the HC catalyst is controlled by the HC feed control so that the rate of temperature increase of the HC catalyst is maintained to be smaller than a predetermined value when the HC feed control is executed to elevate the temperature of the HC catalyst.

The invention in accordance with claim 7 provides the device for purifying exhaust gas according to any one of claims 1 to 5, wherein the object of the HC feed control is to elevate the temperature of the HC catalyst, characterized in that the amount of HC fed to the HC catalyst is controlled by the HC feed control so that the temperature increase rate of the HC catalyst is maintained to be smaller than the predetermined value when the HC feed control is executed.

The invention in accordance with claim 8 provides the device for purifying exhaust gas according to claim 7, characterized in that the object of the HC feed control is to elevate the temperature of the HC catalyst when the internal combustion engine is started.

The present invention suppresses the flow of HC in large amounts through the HC catalyst when the HC feed control is executed.

BEST MODE FOR CARRYING OUT THE INVENTION

Figure 1:
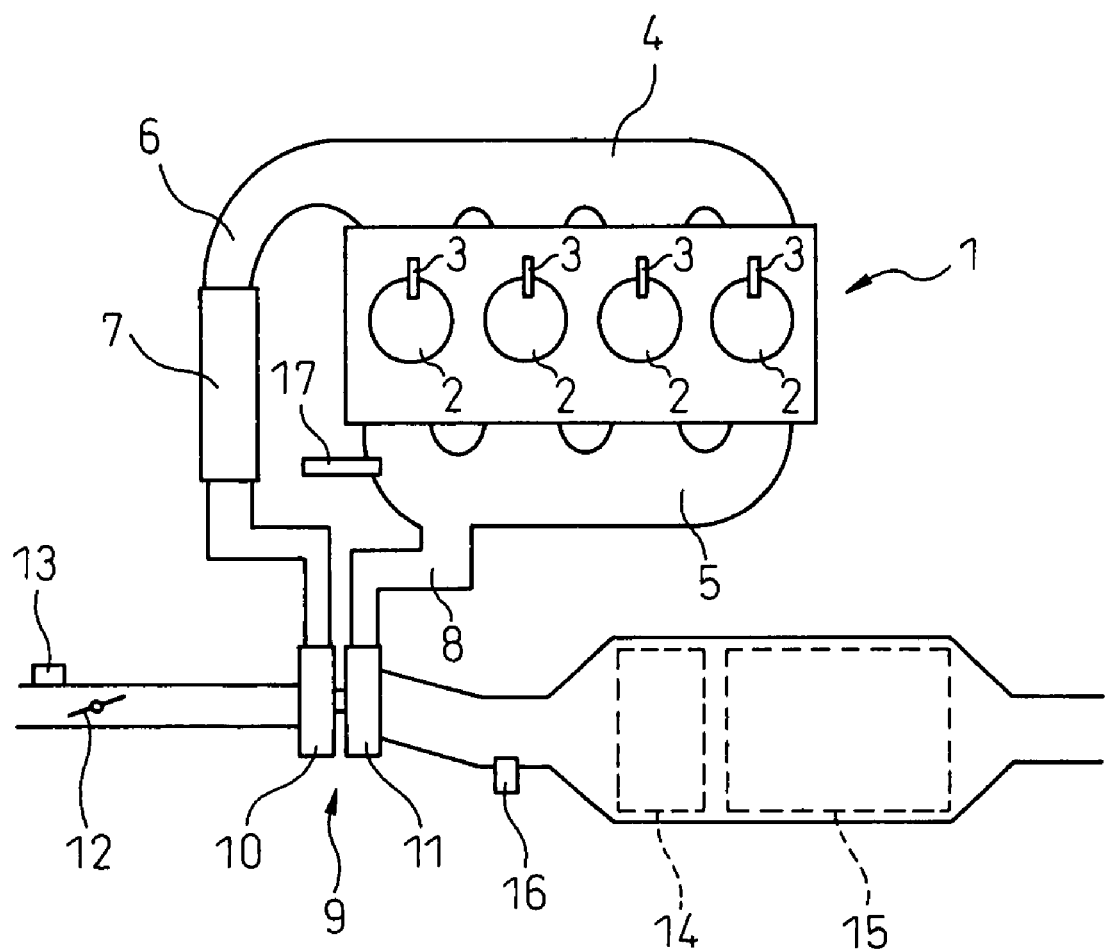
FIG. 1 schematically illustrates an internal combustion engine equipped with a device for purifying exhaust gas according to the present invention.

Hereinafter, the embodiments of the invention will be described with reference to the drawings. FIG. 1 illustrates a compression self-ignition type internal combustion engine (so-called diesel engine) equipped with a device for purifying exhaust gas according to the present invention. The invention, however, can also be applied to an internal combustion engine in which the air-fuel ratio of the mixture is lean in most of the operation regions (e.g., so-called lean burn engine).

In FIG. 1, reference numeral 1 denotes the body of an internal combustion engine, 2 denotes combustion chambers, 3 denotes fuel injection valves, 4 denotes an intake manifold and 5 denotes an exhaust manifold. An intake pipe 6 is connected to the intake manifold 4. An inter-cooler 7 is arranged in the intake pipe 6. On the other hand, an exhaust pipe 8 is connected to the exhaust manifold 5. In FIG. 1, reference numeral 9 denotes an exhaust turbo charger having a compressor 10 arranged in the intake pipe 6 and an exhaust turbine 11 arranged in the exhaust pipe 8. A throttle valve 12 is arranged in the intake pipe 6 upstream of the compressor 10. Further, an air flow meter 13 is attached to the intake pipe 6 upstream of the throttle valve 12. The amount of the air taken into the combustion chambers 2 is detected by the air flow meter 13.

An HC catalyst 14 is arranged in the exhaust pipe 8 downstream of the exhaust turbine 11. A NOx catalyst 15 is arranged in the exhaust pipe 8 immediately downstream of the HC catalyst 14. A temperature sensor 16 is attached to the exhaust pipe 8 between the exhaust turbine 11 and the HC catalyst 14. The temperature sensor 16 detects the temperature of the exhaust gas flowing into the HC catalyst 14. Further, the exhaust manifold 5 is provided with an HC adder unit 17 for adding hydrocarbons (HC) into the exhaust gas. In this embodiment, the HC adder unit 17 uses the fuel as HC to be added into the exhaust gas, which is the same fuel as the fuel fed into the combustion chambers 2 for driving the internal combustion engine.

The HC catalyst 14 has an ability to oxidize HC at a temperature higher than a certain temperature. The HC catalyst also has an ability to adsorb HC by adsorption when the temperature is lower than the above certain temperature (hereinafter referred to as "activating temperature"). However, this does not mean that the HC catalyst does not adsorb HC when its temperature is higher than the activating temperature or does not oxidize HC when its temperature is lower than the activating temperature. That is, the HC catalyst oxidizes HC at a high rate when its temperature is higher than the activating temperature and adsorbs HC at a high rate when its temperature is lower than the activating temperature.

The NOx catalyst 15, on the other hand, has an ability to store NOx (nitrogen oxides) by absorption or adsorption when the air-fuel ratio of the exhaust gas flowing therein is lean at a temperature higher than a certain temperature, while releasing, reducing and purifying NOx, which it has stored when the air-fuel ratio of the exhaust gas flowing therein is the stoichiometric air-fuel ratio or a rich air-fuel ratio at the temperature higher than the above certain temperature (hereinafter referred to as "activating temperature").

The compression self-ignition type internal combustion engine shown in FIG. 1 is operated in a state of a lean air-fuel ratio of the mixture in most of the operation regions. Therefore, the exhaust gas flowing into the NOx catalyst 15 also has a lean air-fuel ratio in most of the operation regions. Accordingly, the total amount of NOx adsorbed by the NOx catalyst (hereinafter referred to as "total amount of NOx adsorbed") gradually increases during the engine operation. However, there is a limit on the amount of NOx that can be adsorbed by the NOx catalyst. If the total amount of NOx adsorbed exceeds the limit value (hereinafter referred to as "NOx adsorption limit value"), the NOx catalyst is no longer capable of adsorbing additional NOx, i.e., NOx flows out to the downstream of the NOx catalyst.

Therefore, this embodiment basically monitors the total amount of NOx adsorbed during engine operation, and executes a control for adding HC into the exhaust gas from the HC adder unit 17 (hereinafter referred to as "reducing HC addition control") so that the air-fuel ratio of the exhaust gas flowing into the NOx catalyst 15 will become the stoichiometric air-fuel ratio or a rich air-fuel ratio when the total amount of NOx adsorbed has reached the NOx adsorption limit value or just before the NOx adsorption limit value. According to the control, the exhaust gas of the stoichiometric air-fuel ratio or a rich air-fuel ratio is fed to the NOx catalyst, and NOx adsorbed by the NOx catalyst is released from the NOx catalyst and is reduced and purified by HC in the exhaust gas as a reducing agent. As the result, the total amount of NOx adsorbed decreases, and the NOx catalyst is allowed to adsorb additional NOx.

When the reducing HC addition control is executed, it is preferable that HC be continuously added from the HC adder unit 17 to the exhaust gas until the total amount of NOx adsorbed becomes zero.

Further, in this embodiment, the reducing HC addition control is executed based on a prerequisite that the temperature of the HC catalyst 14 is higher than the activating temperature thereof (the reducing HC addition control when the temperature of the HC catalyst is lower than the activating temperature thereof will be described later). Therefore, when the reducing HC addition control is executed, HC added from the HC adder unit 17 into the exhaust gas (hereinafter also called "added HC"), flows into the HC catalyst 14. At this time, the temperature of the HC catalyst is higher than the activating temperature thereof, and therefore, HC that has flown into the HC catalyst is oxidized by the HC catalyst. At this time, oxygen in the exhaust gas is consumed, and the oxygen concentration in the exhaust gas decreases. Therefore, the air-fuel ratio of the exhaust gas flowing into the NOx catalyst 15 can be the stoichiometric air-fuel ratio or a rich air-fuel ratio.

When the reducing HC addition control is executed, HC that is added, flows into the HC catalyst 14. In this embodiment, at this time, the temperature of the HC catalyst is higher than the activating temperature thereof, and therefore, HC that has flown into the HC catalyst is oxidized by the HC catalyst. In practice, however, the HC catalyst is oxidizing HC by repetitively adsorbing HC that has flown in and releasing HC that has been adsorbed. Therefore, even when the temperature of the HC catalyst is higher than the activating temperature thereof, the HC catalyst steadily stores a certain amount of HC.

At this time, if the amount of HC that can be oxidized by the HC catalyst 14 (hereinafter referred to as "amount of HC that can be oxidized by the HC catalyst") is larger than the amount of HC released from the HC catalyst (hereinafter referred to as "amount of HC released from the HC catalyst"), HC does not flow out in large amounts from the HC catalyst. However, if the amount of HC steadily adsorbed by the HC catalyst (i.e., total amount of HC adsorbed) is relatively large and the temperature increase rate of the HC catalyst is relatively high, the amount of HC released from the HC catalyst often becomes larger than the amount of HC that can be oxidized by the HC catalyst. In this case, HC flows out in relatively large amounts from the HC catalyst. That is, in this embodiment of the HC catalyst, there exists a condition in which the amount of HC released from the HC catalyst becomes larger than the amount of HC that can be oxidized by the HC catalyst when the reducing HC addition control is executed.

In this embodiment, when the total amount of HC adsorbed by the HC catalyst 14 is larger than a predetermined amount and the temperature increase rate of the HC catalyst is higher than a predetermined value during execution of the reducing HC addition control, the amount of HC fed from the HC adder unit 17 into the exhaust gas (hereinafter referred to as "amount of HC added from the HC adder unit") is decreased to become smaller than a normal amount or the reducing HC addition control itself is discontinued. This suppresses the flow of HC in large amounts from the HC catalyst during execution of the reducing HC addition control.

The normal amount mentioned above related to the amount of HC added by the HC adder unit 17 represents the amount of HC added from the HC adder unit into the exhaust gas by the reducing HC addition control when the total amount of HC adsorbed by the HC catalyst 14 is smaller than a predetermined amount or when the temperature increasing rate of the HC catalyst is less than a predetermined value. The normal amount mentioned below represents the same amount.

The above embodiment is based on a prerequisite that the temperature of the HC catalyst 14 is higher than its activating temperature when it is attempted to execute the reducing HC addition control. However, the temperature of the HC catalyst 14 may be lower than its activating temperature when it is attempted to execute the reducing HC addition control. At that time, even if the reducing HC addition control is executed, HC that is added is adsorbed by the HC catalyst. If HC is adsorbed in large amounts by the HC catalyst, it is not possible to feed the exhaust gas of the stoichiometric air-fuel ratio or a rich air-fuel ratio to the NOx catalyst 15. In order for exhaust gas flowing into the NOx catalyst to be the stoichiometric air-fuel ratio or a rich air-fuel ratio, it is desirable to consume oxygen in the exhaust gas by oxidizing HC by the HC catalyst. Therefore, it is preferable that the temperature of the HC catalyst is higher than its activating temperature when the reducing HC addition control is to be executed.

In the above embodiment, when the temperature of the HC catalyst 14 is lower than its activating temperature at the time of executing the reducing HC addition control, a control to add HC from the HC adder unit 17 into the exhaust gas by an amount necessary for elevating the temperature of the HC catalyst (hereinafter referred to as "HC pre-addition control") is executed. As the result, HC that is added is oxidized by the HC catalyst, though gradually, but the temperature of the HC catalyst is elevated. When the temperature of the HC catalyst is higher than its activating temperature, the reducing HC addition control is executed.

When the temperature increase rate of the HC catalyst 14 is relatively high during execution of the HC pre-addition control, it is possible that the amount of HC released from the HC catalyst is larger than the amount of HC that can be oxidized by the HC catalyst. In this case, HC flows out in a relatively large amount from the HC catalyst. Also, when the temperature increase rate of the HC catalyst is relatively high during execution of the HC pre-addition control, the temperature increase rate of the HC catalyst is relatively high in at least the initial stage of the succeeding reducing HC addition control. In this case, it is possible that the amount of HC released from the HC catalyst is larger than the amount of HC that can be oxidized by the HC catalyst in the initial stage of the reducing HC addition control (In practice, when the HC pre-addition control is being executed, i.e., when the temperature of the HC catalyst is lower than its activating temperature, the amount of HC adsorbed by the HC catalyst tends to increase. During the subsequent execution of the reducing HC addition control, HC is released in relatively large amounts from the HC catalyst. Then, the amount of HC released from the HC catalyst is larger than the amount of HC that can be oxidized by the HC catalyst and is higher when the reducing HC addition control is being executed than when the HC pre-addition control is executed).

A high temperature increase rate of the HC catalyst during the execution of HC pre-addition control is not desirable from the standpoint of suppressing the HC flow-out in large amounts from the HC catalyst 14. Here, if HC is fed in large amounts to the HC catalyst, the temperature of the HC catalyst tends to increase at a large rate. Conversely, if HC is fed in small amounts to the HC catalyst, the temperature of the HC catalyst tends to decrease at a small rate. In this embodiment, therefore, the amount of HC added by the HC adder unit 17 is controlled so that the temperature increase rate of the HC catalyst is not higher than a predetermined value during execution of the HC pre-addition control.

A predetermined value related to the temperature increase rate of the HC catalyst 14 during execution of the above HC pre-addition control is set depending upon the total amount of HC adsorbed by the HC catalyst at that moment, and tends to be low when the total amount of HC adsorbed by the HC catalyst is high.

Here, when the amount of the air taken in by the combustion chambers 2 (hereinafter referred to as "intake air amount") increases, in many cases, the fuel is fed in an increased amount from the fuel injection valves 3 into the combustion chambers 2 resulting in an increase in the temperature of the exhaust gas exhausted from the combustion chambers 2, and an increase in the temperature of the HC catalyst 14 into which the exhaust gas flows. Therefore, an increase in the intake air amount at a large rate means an increase in the temperature of the HC catalyst at a large rate. When the increase rate of the amount of intake air is large when the HC catalyst is adsorbing HC in a relatively large amount, it is probable that the amount of HC released from the HC catalyst is larger than the amount of HC that can be oxidized by the HC catalyst.

In the above embodiment, therefore, when the total amount of HC adsorbed by the HC catalyst 14 is larger than a predetermined amount and the rate of increase in the intake air amount is larger than a predetermined value at the time when the reducing HC addition control is executed, the amount of HC added by the HC adder unit 17 may be decreased to be smaller than a normal amount or the reducing HC addition control itself may be discontinued.

When the fuel is fed in an increased amount from the fuel injection valves 3 into the combustion chambers 2, the temperature of the exhaust gas exhausted from the combustion chambers 2 increases, resulting in an increase in the temperature of the HC catalyst 14 into which the exhaust gas flows. In the above embodiment, therefore, when the total amount of HC adsorbed by the HC catalyst 14 is larger than a predetermined amount and the rate of increase in the amount of fuel fed from the fuel injection valves 3 into the combustion chambers 2 is larger than a predetermined value when the reducing HC addition control is executed, the amount of HC added by the HC adder unit 17 may be decreased to be smaller than a normal amount or the reducing HC addition control itself may be discontinued.

Further, in many cases, when the amount of depression of accelerator pedal increases, the intake air amount increases, and the amount of fuel fed from the fuel injection valves 3 into the combustion chambers 2 increases, resulting in an increase in the temperature of the exhaust gas exhausted from the combustion chambers 2, and an increase in the temperature of the HC catalyst 14 into which the exhaust gas flows. In the above embodiment, when the total amount of HC adsorbed by the HC catalyst is larger than a predetermined amount and the rate of increase in the amount of depression of the accelerator pedal is larger than a predetermined value at the time when the reducing HC addition control is executed, the amount of HC added by the HC adder unit 17 may be decreased to be smaller than a normal amount or the reducing HC addition control itself may be discontinued.

In the above embodiment and in the embodiments that will be described below, a predetermined amount related to the total amount of HC adsorbed by the HC catalyst 14, a predetermined value related to the temperature increase rate of the HC catalyst, a predetermined value related to the rate of increase in the intake air amount, a predetermined value related to the amount of fuel fed into the combustion chambers 2 and a predetermined value related to the amount of depression of the accelerator pedal, are set depending upon the degree of deterioration in the performance of the HC catalyst (e.g., HC-adsorbing capability and HC-oxidizing capability of the HC catalyst), and tend to be small with an increase in the degree of deterioration in the performance of the HC catalyst.

In the above embodiment and in the embodiments that will be described below, further, the temperature of the HC catalyst 14 is estimated from the exhaust gas temperature detected by the temperature sensor 16 that flows into the HC catalyst.

Further, the total amount of HC adsorbed by the HC catalyst 14 is calculated in a manner, for example, as described below. That is, when the temperature of the HC catalyst is lower than its activating temperature, the amount of HC to be adsorbed by the HC catalyst, of the HC emitted from the combustion chambers 2, is determined in advance by experiment for each of the engine operating conditions such as the engine rotational speed and the engine load, and is stored in the ECU. Further, when the temperature of the HC catalyst becomes higher than its activating temperature, the amount of HC to be oxidized and removed from the HC adsorbed by the HC catalyst is determined in advance by experiment and is stored in the ECU. When the temperature of the HC catalyst is lower than its activating temperature during the engine operation, the amount of HC adsorbed by the HC catalyst is read out from the ECU, which is part of HC emitted from the combustion chambers 2 depending upon the engine operating conditions, and the amount of HC that is read out is integrated. When the temperature of the HC catalyst is higher than its activating temperature, the amount of HC to be oxidized and removed is read out from the ECU, which is part of HC adsorbed by the HC catalyst, and the amount of HC that is read out is subtracted. Thus, the total amount of HC to be adsorbed is calculated.

When the amount of HC added by the HC adder unit 17 is so controlled that the temperature increase rate of the HC catalyst is not larger than a predetermined value during execution of the HC pre-addition control, the HC adder unit stores in the ECU the amount of HC which maintains the temperature increase rate of the HC catalyst 14 to be not larger than a predetermined value in combination with a time interval for adding HC from the HC adder unit, that have been determined in advance by experiment, reads from the ECU the amount of HC to be added from the HC adder unit and the time interval for adding HC from the HC adder unit in combination depending upon a predetermined value related to the temperature increase rate of the HC catalyst during execution of the HC pre-addition control, and HC is added from the HC adder unit by an amount read out in a time interval that is read out.

Figure 2:
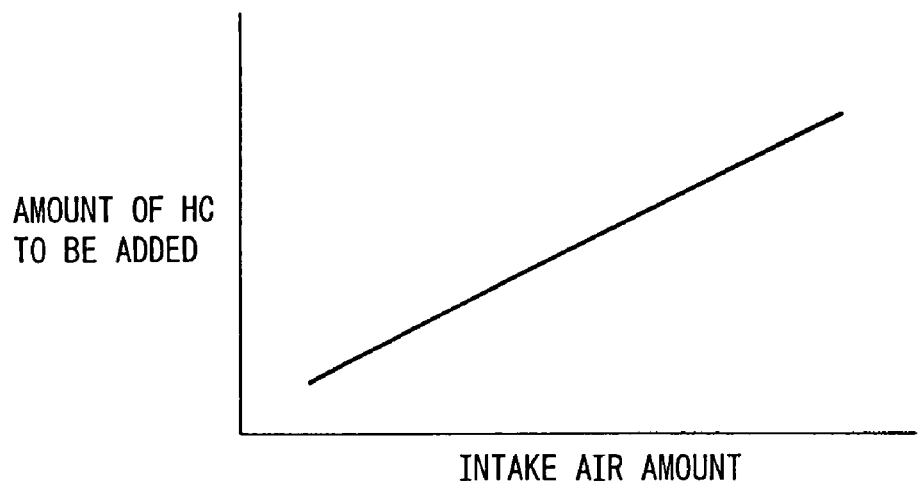
FIG. 2 is a graph illustrating the relationship of a HC pre-addition control.
Figure 2:
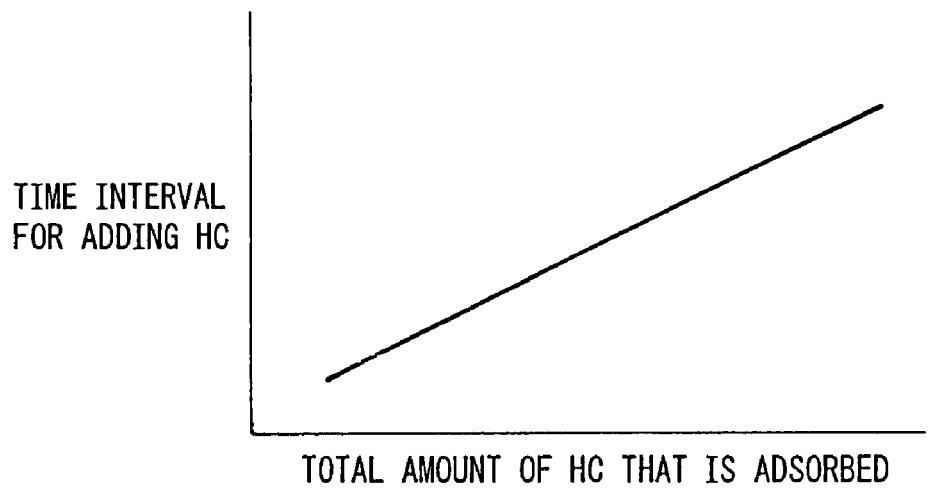

In executing the HC pre-addition control, the amount of HC to be added from the HC adder unit 17 may be determined depending upon the intake air amount, and the time interval for adding HC from the HC adder unit may be determined depending upon the total amount of HC adsorbed by the HC catalyst 14. In this case, for example, FIG. 2(A) can be used for a relationship between the amount of HC to be added from the HC adder unit and the intake air amount. In the relationship shown in FIG. 2(A), the larger the intake air amount is, the larger the amount of HC to be added from the HC adder unit is set to be. Further, for example, FIG. 2(B) can be used for a relationship between the time interval for adding HC from the HC adder unit and the total amount of HC adsorbed. In the relationship shown in FIG. 2(B), the larger the total amount of HC to be adsorbed is, the longer the time interval for adding HC from the HC adder unit is set to be.

When the amount of HC added by the HC adder unit 17 is controlled so that the temperature increase rate of the HC catalyst 14 is not larger than a predetermined value during execution of the HC pre-addition control, the temperature sensor may detect the temperature of the HC catalyst or the temperature of the HC catalyst may be estimated by a temperature estimation logic. Relying upon the obtained temperature of the HC catalyst, the amount of HC added from the HC adder unit and the time interval for adding HC from the HC adder unit may be controlled by feedback so that the temperature increase rate of the HC catalyst is not larger than a predetermined value.

In the above embodiment, HC is added by the HC adder unit 17 in an amount smaller than the normal amount or the reducing HC addition control itself is discontinued when there is a specific condition in which a total amount of HC adsorbed on the HC catalyst 14 is larger than a predetermined amount and the temperature increase rate of the HC catalyst, a rate of increase in the intake air amount, a rate of increase in the amount of fuel fed into the combustion chambers 2 or a rate of increase in the amount of depression of the accelerator pedal, is larger than a predetermined value during the reducing HC addition control. Here, the specific condition mentioned above is a condition when the amount of HC released from the HC catalyst is larger than the amount of HC that can be oxidized by the HC catalyst. However, there are cases where the amount of HC released from the HC catalyst becomes larger than the amount of HC that can be oxidized by the HC catalyst even though the above-noted specific conditions have not been established. The present invention can also be applied to these cases. Therefore, the present invention decreases the amount of HC added by the HC adder unit to be smaller than the normal amount or discontinues the reducing HC addition control itself when there is a condition in which the amount of HC released from the HC catalyst is larger than the amount of HC that can be oxidized by the HC catalyst when the reducing HC addition control is executed.

In the foregoing, an example was described in which the invention was applied when HC is added from the HC adder unit 17 (i.e., when the reducing HC addition control is executed) in order to reduce and purify NOx adsorbed by the NOx catalyst 15. However, the temperature of the HC catalyst rises when HC is fed to the HC catalyst 14. Therefore, the present invention can be applied even when HC is added by the HC adder unit in order to simply elevate the temperature of the HC catalyst. Further, oxidation of HC in the HC catalyst elevates the temperature of the exhaust gas in the HC catalyst, and the exhaust gas elevates the temperature of the catalyst arranged downstream of the HC catalyst. When an element for purifying exhaust gas is arranged downstream of the HC catalyst, HC can be added from the HC adder unit by applying the present invention in order to elevate the temperature of the element.

The NOx catalyst 15 stores sulfur oxides (SOx) by absorption or adsorption based on the same mechanism as that of adsorption of NOx. To remove the adsorbed SOx from the NOx catalyst, the temperature of the NOx catalyst may be elevated higher than its activating temperature, and the exhaust gas of the stoichiometric air-fuel ratio or a rich air-fuel ratio may be fed to the NOx catalyst. Therefore, the present invention can be applied even when HC is to be added from the HC adder unit 17 in order to remove SOx adsorbed by the NOx catalyst.

Further, HC may be added from the HC adder unit 17 to attain an object other than the objects described above. Therefore, it can be said generally that the invention is applicable when HC is to be added from the HC adder unit to attain a specific object. In other words, the present invention works to decrease the amount of HC added by the HC adder unit to be smaller than the normal amount or discontinue the feeding itself of HC to the HC catalyst when there is the above-mentioned specific condition (e.g., a total amount of HC adsorbed by the HC catalyst is larger than a predetermined amount and the temperature increase rate of the HC catalyst is larger than a predetermined value) at the time when HC is fed to the HC catalyst 14 to attain a specific object.

Here, a certain period of time is required for HC to be oxidized by the HC catalyst 14. On the other hand, the exhaust gas continues to flow through the HC catalyst while HC is being oxidized by the HC catalyst. Therefore, HC that is not oxidized by the HC catalyst migrates through the HC catalyst being carried by the exhaust gas and often flows out of the HC catalyst. Namely, the time in which HC stays in the HC catalyst is limited within a certain period of time.

In this case, if the time required for HC to be oxidized by the HC catalyst 14 (hereinafter referred to as "HC-oxidizing time by the HC catalyst") is shorter than the time in which HC stays in the HC catalyst (hereinafter referred to as "HC residence time in the HC catalyst"), HC does not flow out of the HC catalyst in a large amount. However, if the total amount of HC adsorbed by the HC catalyst is relatively large and the exhaust gas passes through the HC catalyst in a relatively large amount (i.e., the exhaust gas passes through the HC catalyst in large amounts and, therefore, the flow speed of the exhaust gas through the HC catalyst is high), the HC residence time in the HC catalyst may become shorter than the HC-oxidizing time by the HC catalyst. In this case, HC flows out of the HC catalyst in relatively large amount. That is, the HC catalyst of this embodiment has a condition in which the HC residence time in the HC catalyst becomes shorter than the time HC to be oxidized by the HC catalyst during execution of HC addition control.

In this embodiment, therefore, the amount of adding HC by the HC adder unit 17 is decreased to be smaller than the normal amount or the reducing HC addition control is discontinued when the total amount of HC adsorbed by the HC catalyst 14 is larger than a predetermined amount and the amount of exhaust gas passing through the HC catalyst is larger than a predetermined amount at the time when the reducing HC addition control is executed. This suppresses such an occurrence that HC flows out of the HC catalyst in a large amount during execution of the reducing HC addition control.

Even when the total amount of HC adsorbed by the HC catalyst 14 is relatively large and the amount of exhaust gas passing through the HC catalyst is increasing at a relatively large rate, the HC residence time in the HC catalyst may become shorter than the time HC to be oxidized by the HC catalyst.

In the above embodiment, therefore, the amount of HC added by the HC adder unit 17 may be decreased to be smaller than the normal amount or the reducing HC addition control may be discontinued when the total amount of HC adsorbed by the HC catalyst 14 is larger than a predetermined amount and the amount of exhaust gas passing through the HC catalyst is increasing at a rate larger than a predetermined value at the time when the reducing HC addition control is executed.

Here, when the amount of intake air is large, the exhaust gas is discharged in large amounts from the combustion chambers 2 and, as a result, the exhaust gas flows through the HC catalyst 14 in a large amount. Further, when the rate of increase in the intake air amount is large, the amount of exhaust gas discharged from the combustion chamber 2 increases at a large rate and, as a result, the amount of exhaust gas flowing through the HC catalyst increases at a large rate.

Therefore, the amount of HC added by the HC adder unit 17 may be decreased to be smaller than the normal amount or the reducing HC addition control may be discontinued when the total amount of HC adsorbed by the HC catalyst 14 is larger than a predetermined amount and the intake air amount is larger than a predetermined amount at the time when the reducing HC addition control is executed.

Further, when the amount of depression of the accelerator pedal is large, in many cases, the intake air amount is large, and as the result, the exhaust gas flows in large amounts through the HC catalyst 14. Further, when the rate of increase in the amount of depression of the accelerator pedal is large, in many cases, the intake air amount increases at a large rate, and as the result, the amount of exhaust gas flowing through the HC catalyst increases at a large rate.

Therefore, the amount of HC added by the HC adder unit 17 may be decreased to be smaller than the normal amount or the reducing HC addition control may be discontinued when the total amount of HC adsorbed by the HC catalyst 14 is larger than a predetermined amount and the amount of depression of the accelerator pedal is larger than a predetermined amount or the rate of increase in the amount of depression of accelerator pedal is larger than a predetermined value at the time when the reducing HC addition control is executed.

In the above embodiment, a predetermined amount related to the amount of exhaust gas passing through the HC catalyst 14, a predetermined value related to the rate of increase in the amount of exhaust gas passing through the HC catalyst, a predetermined amount related to the intake air amount and a predetermined amount related to the amount of depression of the accelerator pedal, are set depending upon the degree of deterioration in the performance of the HC catalyst, and tends to be small with an increase in the degree of deterioration in the performance of the HC catalyst.

In the above embodiment, further, the amount of HC added by the HC adder unit 17 is decreased to be smaller than the normal amount or the reducing HC addition control is discontinued when there is the condition in which a total amount of HC adsorbed by the HC catalyst 14 is larger than a predetermined amount, and an amount of exhaust gas passing through the HC catalyst or a rate of increase thereof, an air intake amount or a rate of increase thereof, or an amount of depression of the accelerator pedal or a rate of increase thereof, is larger than the predetermined amount or the predetermined value at the time when the reducing HC addition control is executed. Here, the above specific condition is a condition when the HC residence time in the HC catalyst is shorter than the HC-oxidizing time by the HC catalyst. However, there are cases where the HC residence time in the HC catalyst is shorter than the HC-oxidizing time by the HC catalyst even though the above-noted specific conditions have not been established. The present invention can also be applied to these cases. Therefore, the present invention works to decrease the amount of HC added by the HC adder unit to be smaller than the normal amount or discontinue the reducing HC addition control when there is a condition in which the HC residence time in the HC catalyst becomes shorter than the HC-oxidizing time by the HC catalyst at the time when the reducing HC addition control is executed.

In the above embodiment, the element for purifying exhaust gas that can be used instead of the NOx catalyst 15 is a particulate filter for trapping particulates in the exhaust gas, the particulate filter carrying a noble metal catalyst and an active-oxygen releasing agent. The particulate filter (hereinafter called "filter") oxidizes and removes the trapped particulates within a relatively short period of time relying upon active-oxygen formed by the noble metal catalyst and the active-oxygen releasing agent.

As for the noble metal catalyst, there can be used platinum (Pt). On the other hand, as for the active-oxygen releasing agent, there can be used at least one selected from alkali metals such as potassium (K), sodium (Na), lithium (Li), cesium (Cs) and rubidium (Rb); alkaline earth metals such as barium (Ba), calcium (Ca) and strontium (Sr); rare earth elements such as lanthanum (La), yttrium (Y) and cerium (Ce); transition metals such as iron (Fe); and carbon group elements such as tin (Sn).

Figure 3:
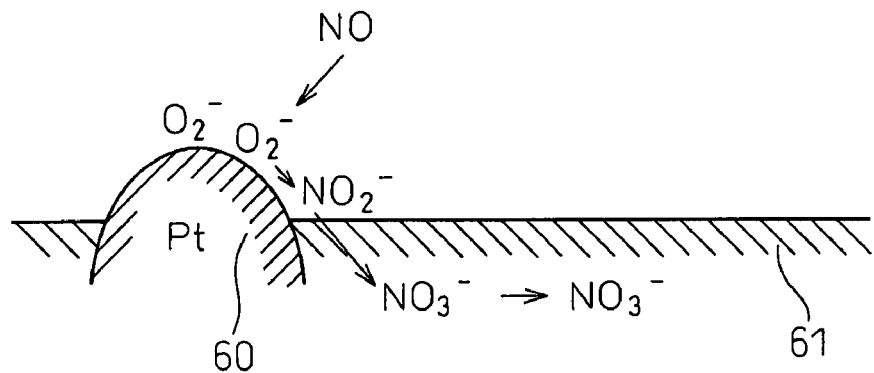
FIG. 3 is a graph illustrating the reaction of oxidizing and removing particulates.
Figure 3:
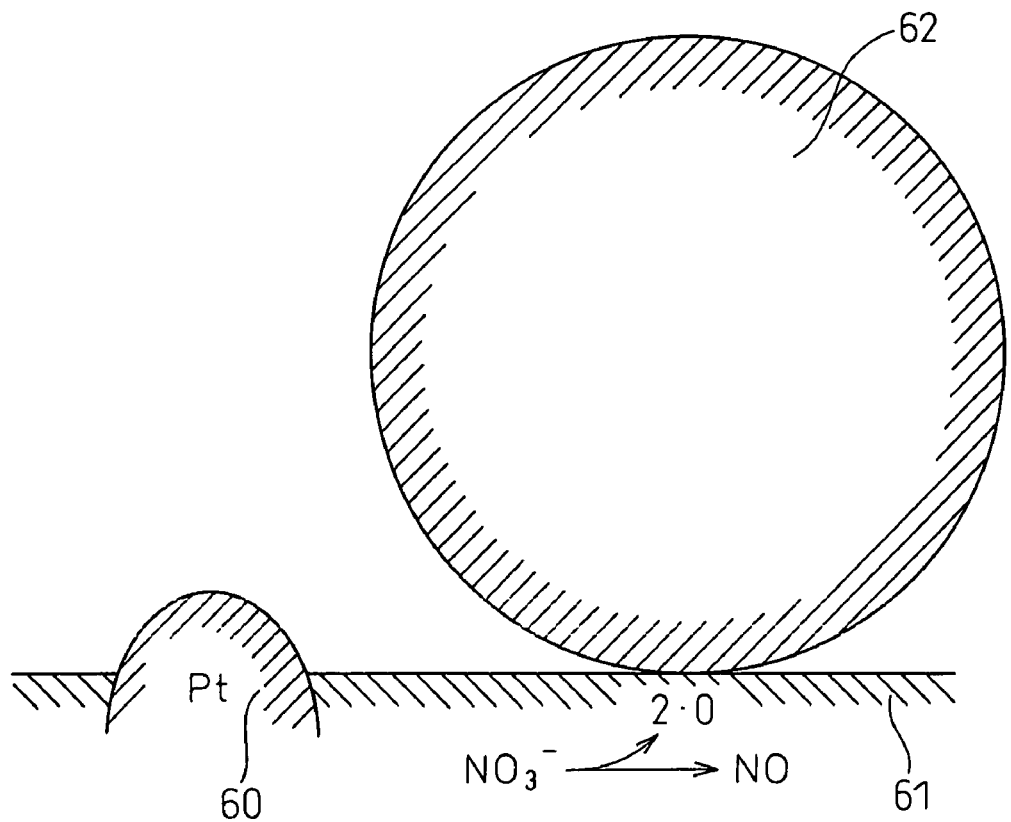

As the exhaust gas flows into the filter as shown in FIG. 3(A), oxygen ($O_2$) in the exhaust gas deposits in the form of $O_2^-$ or $O^{2-}$ on the surface of platinum 60. NO in the exhaust gas reacts with $O_2^-$ or $O^{2-}$ to form $NO_2$. $NO_2$ thus formed is partly oxidized on platinum, stored by being absorbed in the active-oxygen releasing agent 61, diffuses in the active-oxygen releasing agent 61 in the form of nitric acid ions ($NO_3^-$) while being bonded to potassium (K) as shown in FIG. 3(A) to thereby form potassium nitrate ($KNO_3$). That is, oxygen in the exhaust gas is stored in the form of potassium nitrate ($KNO_3$) by being absorbed in the active-oxygen releasing agent 61.

Here, shown as numeral 62 in FIG. 3(B), if a particulate comes in contact with the surface of the active-oxygen releasing agent and deposits thereon, the oxygen concentration decreases on the contact surface of the active-oxygen releasing agent 61 contacted with the particulate 62. That is, the oxygen concentration in the surrounding of the active-oxygen releasing agent 61 decreases. As the oxygen concentration decreases, a difference in the concentration occurs relative to the interior of the active-oxygen releasing agent 61 having a high oxygen concentration, and oxygen in the active-oxygen releasing agent 61 tends to migrate toward the contact surface of the active-oxygen releasing agent 61 contacted with the particulate 62. As the result, potassium nitrate ($KNO_3$) formed in the active carbon-forming agent 61 is decomposed into potassium (K), oxygen (O) and NO, whereby oxygen (O) migrates toward the contact surface of the active-oxygen releasing agent 61 contacted with the particulate 62 while NO is released toward the exterior from the active-oxygen releasing agent 61.

Here, oxygen migrating toward the contact surface of the active-oxygen releasing agent 61 contacted with the particulate 62 is the one decomposed from a compound such as potassium nitrate, and has an unpaired electron to exhibit very high reactivity. Thus, the active-oxygen releasing agent 61 forms active-oxygen. NO released to the exterior is oxidized on platinum on the downstream side and is adsorbed again in the active-oxygen releasing agent 61.

Active-oxygen formed by the active-oxygen releasing agent 61 is consumed for oxidizing and removing the particulates 62 deposited thereon. That is, particulates 62 trapped by the filter are oxidized and removed with active-oxygen formed by the active-oxygen releasing agent 61.

As described above, particulates trapped by the filter are oxidized and removed with highly reactive active-oxygen without producing a flame. Therefore, the filter is not heated to an excessive degree and is not deteriorated by heat.

Figure 4:
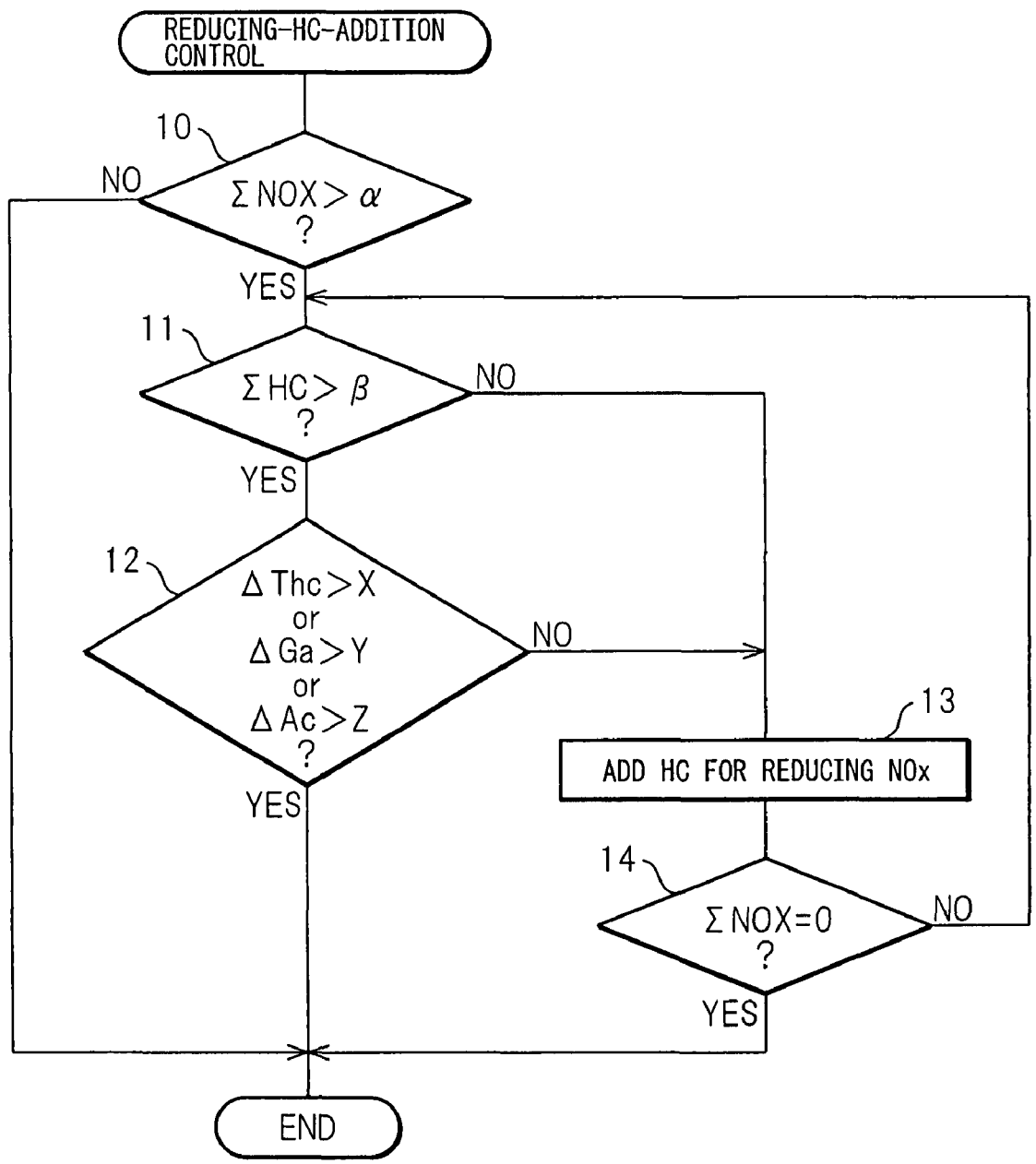
FIG. 4 is a diagram illustrating a program routine for executing a reducing HC addition control according to the present invention.

FIG. 4 illustrates a program routine for executing the reducing HC addition control according to the above embodiment. In the routine of FIG. 4, first, it is determined at step 10 if the amount of NOx, i.e., $\Sigma NOX$, adsorbed by the NOx catalyst 15 is larger than a predetermined amount $\alpha$ ($\Sigma NOX > \alpha$) or not. If it is determined that $\Sigma NOX \leq \alpha$, then the routine ends. If it is determined that $\Sigma NOX > \alpha$, on the other hand, the routine proceeds to step 11 where it is determined if the total amount of HC adsorbed, i.e., $\Sigma HC$, of the HC catalyst 14 is larger than a predetermined amount $\beta$ ($\Sigma HC > \beta$) or not. Here, if it is determined that $\Sigma HC \leq \beta$, the routine proceeds to step 13 where HC is added from the HC adder unit 17 in order to reduce and purify NOx adsorbed by the NOx catalyst. If it is determined that $\Sigma HC > \beta$, on the other hand, the routine proceeds to step 12.

At step 12, it is determined if the temperature increase rate $\Delta Thc$ of the HC catalyst 14 is larger than a predetermined value X ($\Delta Thc > X$), or if a rate of increase in the amount of exhaust gas $\Delta Ga$ flowing into the HC catalyst is larger than a predetermined value Y ($\Delta Ga > Y$) or if a rate of increase in the amount of depression of accelerator pedal $\Delta Ac$ is larger than a predetermined value Z ($\Delta Ac > Z$) or not. Here, if it is determined that $\Delta Thc > X$, or $\Delta Ga > Y$, or $\Delta Ac > Z$, the routine ends. In this case, no HC is added from the HC adder unit 17 (reducing HC addition control is discontinued).

On the other hand, if it is determined at step 12 that $\Delta Thc \leq X$ and $\Delta Ga \leq Y$ and $\Delta Ac \leq Z$, the routine proceeds to step 13 where HC is added from the HC adder unit 17 in order to reduce and purify NOx adsorbed by the NOx catalyst 15.

At step 14, it is determined if the amount of NOx, i.e., ΣNOX, adsorbed by the NOx catalyst 15 has become zero (ΣNOX=0). If it is determined that ΣNOX≠0, the routine returns back to step 11 where it is so determined that ΣHC>β proceeds to the next step 12. If it is determined at step 12 that ΔThc>X or ΔGa>Y or ΔAc>Z, the routine ends (reducing HC addition control is discontinued).

However, if it is determined at step 11 that ΣHC≦β, or if it is determined at step 11 that ΣHC>β, but at next step 12 that ΔThc≦X and ΔGa≦Y and ΔAc≦Z, the routine proceeds to step 13 where HC is added from the HC adder unit 17 (reducing HC addition control continues).

If it is determined at step 14 that ΣNOX=0, the routine ends (reducing HC addition control ends).

Figure 5:
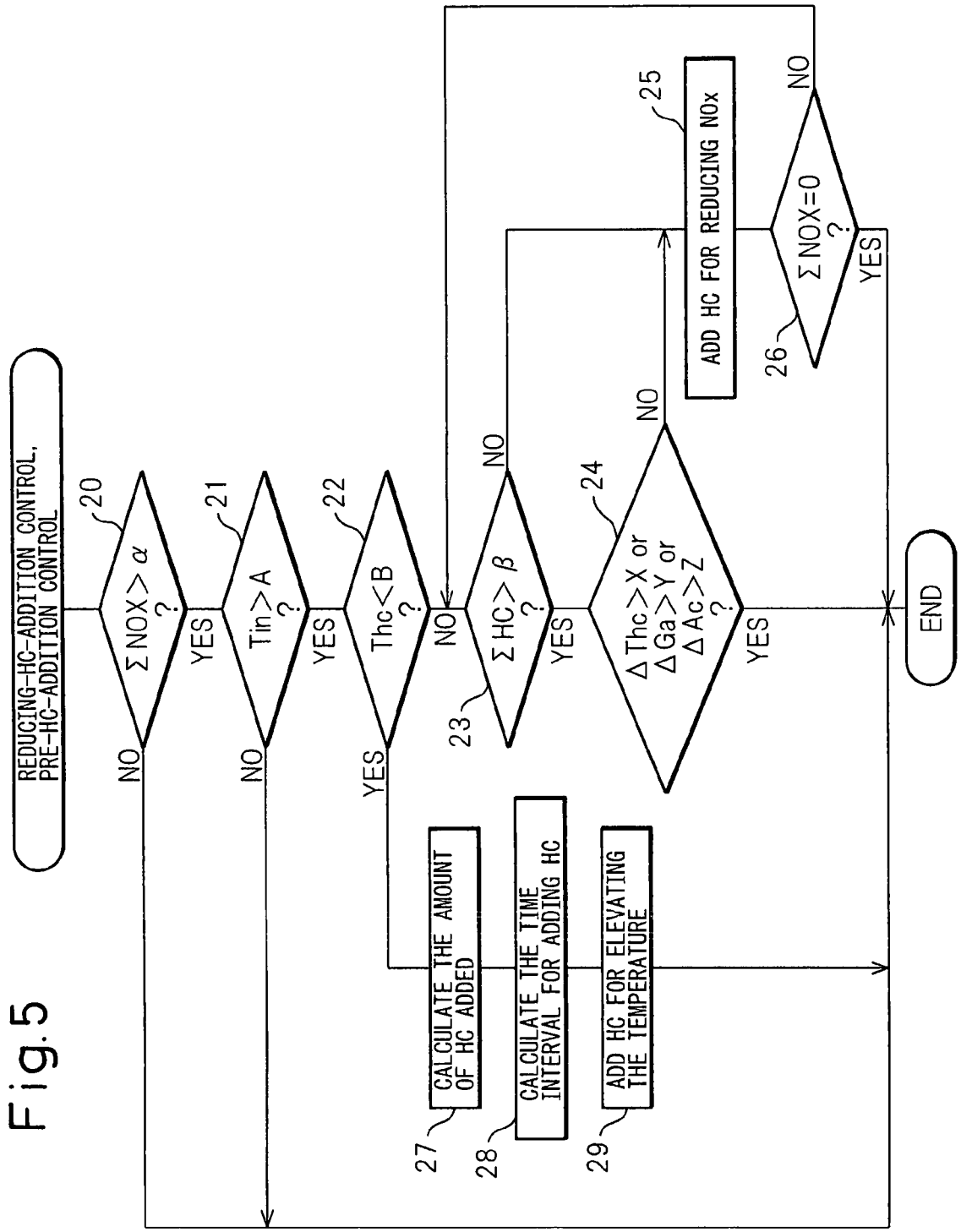
FIG. 5 is a diagram illustrating a program routine for executing the reducing HC addition control and the HC pre-addition control according to the present invention.

FIG. 5 illustrates one example of the program routine for executing the reducing HC addition control and the HC pre-addition control according to the above-mentioned embodiment. In the routine of FIG. 5, first, it is determined at step 20 if the amount of NOx, i.e. ΣNOX, adsorbed by the NOx catalyst 15 is larger than a predetermined amount a (ΣNOX>α). If it is determined that ΣNOX≦α, then the routine ends. If it is determined that ΣNOX>α, on the other hand, the routine proceeds to step 21 where it is determined if the temperature Tin of the exhaust gas flowing into the HC catalyst 14 is higher than a predetermined value A (Tin>A).

If it is determined at step 21 that Tin≦A, then the routine ends. If it is determined that Tin>A, on the other hand, the routine proceeds to step 22 where it is determined if the temperature Thc of the HC catalyst 14 is lower than a predetermined value B (Thc<B). Here, if it is determined that Thc<B, the HC pre-addition control is executed at step 27 and at subsequent steps. That is, the amount of HC to be added from the HC adder unit 17 is calculated at step 27, the time interval for adding HC from the HC adder unit is calculated at step 28, and at step 29, HC is added from the HC adder unit into the exhaust gas according to the calculated amount of HC addition and the calculated time interval in order to elevate the temperature of the HC catalyst.

On the other hand, if it is determined at step 22 that Thc≧B, step 23 through step 26 are executed. The step 23 through step 26 are the same as step 11 through step 14 in FIG. 4, and are not described here again.

The invention claimed is:

1. A device for purifying exhaust gas of an internal combustion engine comprising an HC catalyst having an ability to oxidize HC, as well as adsorb HC and release HC which has been adsorbed, the device configured to execute an HC feed control for feeding HC to the HC catalyst, and under the condition that a specific condition exists, the specific condition being where an amount of HC to be released becomes larger than an amount of HC to be oxidized, and the specific condition is established during execution of the HC feed control, an amount of HC fed to the HC catalyst is decreased by the HC feed control, or the HC feed control is discontinued.

2. The device for purifying exhaust gas according to claim 1, wherein the specific condition is that a total amount of HC adsorbed by the HC catalyst is larger than a predetermined amount and at least one of a temperature increase rate of HC catalyst, a rate of increase in an amount of air taken in by the internal combustion engine, a rate of increase in an amount of fuel fed into the combustion chambers of the internal combustion engine or a rate of increase in an amount of depression of accelerator pedal, is larger than a predetermined value.

3. A device for purifying exhaust gas of an internal combustion engine comprising an HC catalyst having a capability of oxidizing HC, the device configured to execute an HC feed control for feeding HC to the HC catalyst, and under the condition that a specific condition exists, the specific condition being where a HC residence time becomes shorter than a time required for oxidizing HC, and the specific condition is established during execution of the HC feed control, the amount of HC fed to the HC catalyst is decreased by the HC feed control, or the HC feed control is discontinued.

4. The device for purifying exhaust gas according to claim 1, wherein the specific condition is that a total amount of HC adsorbed by the HC catalyst is larger than a predetermined amount and that at least one of an amount of exhaust gas passing through the HC catalyst or a rate of increase thereof, an amount of air taken in the combustion chambers of the internal combustion engine or a rate of increase thereof, or an amount of depression of accelerator pedal or a rate of increase thereof, is larger than a predetermined value.

5. The device for purifying exhaust gas according to claim 1, equipped with a NOx catalyst in the downstream of the HC catalyst, wherein the NOx catalyst is provided to adsorb NOx when an air-fuel ratio of the exhaust gas that flows in is lean and to reduce NOx that is adsorbed when the air-fuel ratio of the exhaust gas that flows in becomes a stoichiometric air-fuel ratio or a rich air-fuel ratio, and an object of the HC feed control is to let the exhaust gas of the stoichiometric air-fuel ratio or of the rich air-fuel ratio flow into the NOx catalyst.

6. The device for purifying exhaust gas according to claim 1, equipped with a NOx catalyst in the downstream of the HC catalyst, wherein the NOx catalyst is provided to adsorb NOx when an air-fuel ratio of the exhaust gas that flows in is lean and to reduce NOx that is adsorbed when the air-fuel ratio of the exhaust gas that flows in becomes a stoichiometric air-fuel ratio or a rich air-fuel ratio, and an object of the HC feed control is to elevate a temperature of the HC catalyst and to let the exhaust gas of the stoichiometric air-fuel ratio or of the rich air-fuel ratio flow into the NOx catalyst, wherein the amount of HC fed to the HC catalyst is controlled by the HC feed control so that a rate of temperature increase of the HC catalyst is maintained to be smaller than a predetermined value when the HC feed control is executed to elevate the temperature of said HC catalyst.

7. The device for purifying exhaust gas according to claim 1, wherein said object of the HC feed control is to elevate a temperature of the HC catalyst, wherein an amount of HC fed to the HC catalyst is controlled, by the HC feed control so that a temperature increase rate of the HC catalyst is maintained to be smaller than a predetermined value, wherein the predetermined value is set depending upon the degree of deterioration in the performance of the HC catalyst, when said HC feed control is executed.

8. The device for purifying exhaust gas according to claim 7, wherein an object of the HC feed control is to elevate the temperature of said HC catalyst when the internal combustion engine is started.

* * * * *